Patented Sept. 11, 1934

1,972,892

UNITED STATES PATENT OFFICE 1,972,892

METHOD OF EXTRACTING DIPHENYLAMINE

William T. Ingraham, Dover, N. J.

No Drawing. Application June 7, 1933, Serial No. 674,716

6 Claims. (Cl. 260—148)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a method of extracting diphenylamine and its derivatives from smokeless powder.

Smokeless powder that has deteriorated may be ground and reworked into a new powder after removing any free acid present. If the deteriorated powder is to be converted into a product such as nitrocellulose lacquer it is necessary to remove the diphenylamine and its nitroderivatives as well as reduce the viscosity of the nitrocellulose. It is therefore proposed in the present invention to provide a simple and economical method of removing diphenylamine and its derivatives from smokeless powder.

The method consists in grinding deteriorated smokeless powder and treating it with a mixture of a solvent for diphenylamine which is not a gelatinizing agent for nitrocellulose and an agent that prevents or retards gelatinization. An example of such a mixture consists of acetic acid and water, the proportions to be employed depending upon the completeness of extraction desired, the length of time of soaking and the number of washes.

A preferred mixture consisting of 70% to 75% acetic acid and 25% to 30% water, will give almost a complete extraction of the original diphenylamine present in the powder. Mixtures of equal parts of acetic acid and water will slightly reduce the extent of removal of the diphenylamine.

The treatment is effected by allowing the comminuted powder to soak at room temperature in one or more successive baths of the diluted acetic acid. The extent of extraction of the diphenylamine is influenced by the fineness of the powder, the number and length of the washes, and the proportion of the mixture.

The solvent does not cause the smokeless powder to become swollen or adhesive and no difficulty is experienced in handling the powder during or after extraction.

Another advantage of the process is that it lends itself to the reduction of the viscosity of the nitrocellulose in the powder. This can be done by treating the powder, subsequent to the removal of the diphenylamine and its derivatives, with acetone containing a quantity of acetic acid.

I claim:

1. The method of treating smokeless powder for removal of diphenylamine which consists in comminuting the powder and washing it at room temperature in one or more baths of a mixture composed of acetic acid 50% to 75% and water 50% to 25%.

2. The method of treating smokeless powder for removal of diphenylamine which consists in comminuting the powder and washing it in one or more baths of a mixture composed of acetic acid 50% to 75% and water 50% to 25%.

3. The method of treating smokeless powder for removal of diphenylamine which consists in comminuting the powder and washing it at room temperature in one or more baths of a mixture composed of acetic acid and water.

4. The method of treating smokeless powder for removal of diphenylamine which consists in comminuting the powder and washing it in one or more baths of a mixture composed of acetic acid and water.

5. The method of removing diphenylamine from comminuted smokeless powder which consists in submitting the powder to the action of a mixture of acetic acid 70% and water 30%.

6. The method of removing diphenylamine from comminuted smokeless powder which consists in submitting the powder to the action of a mixture of acetic acid 50 to 75 parts and water 50 to 75 parts.

WILLIAM T. INGRAHAM.